United States Patent [19]
Maypole et al.

[11] Patent Number: 5,094,500
[45] Date of Patent: Mar. 10, 1992

[54] GOLF CART HAVING AN IMPROVED ROOF

[75] Inventors: William H. Maypole, Augusta, Ga.; Charles R. Sagraves, Dearborn Hgts., Mich.; Samuel C. Crosby; William J. Sanders, both of Lithonia, Ga.; William F. Price, Portage, Wis.

[73] Assignee: Textron Inc., Providence, R.I.

[21] Appl. No.: 453,777

[22] Filed: Dec. 20, 1989
(Under 37 CFR 1.47)

[51] Int. Cl.⁵ .............................................. B62D 25/06
[52] U.S. Cl. .................................. 296/102; 296/901; 280/DIG. 5
[58] Field of Search ............... 296/102, 210, 901, 77.1; 280/DIG. 5

[56] References Cited
U.S. PATENT DOCUMENTS

| | | | |
|---|---|---|---|
| D. 255,558 | 6/1980 | Ekuan | D12/16 |
| 4,037,614 | 7/1977 | Hines et al. | 296/102 |
| 4,098,536 | 7/1978 | Mills | 296/78 |
| 4,334,692 | 6/1982 | Lynch | 280/79.1 |
| 4,428,306 | 1/1984 | Dresen et al. | 108/53.3 |
| 4,533,013 | 8/1985 | Hightower | 180/210 |
| 4,570,894 | 2/1986 | Miele | 248/534 |
| 4,650,238 | 3/1987 | Healey | 296/37.7 |
| 4,705,293 | 11/1987 | Hart | 280/641 |
| 4,744,430 | 5/1988 | McCoy | 180/2.2 |
| 4,772,064 | 9/1988 | Moore | 296/102 |
| 4,773,695 | 9/1988 | Jones et al. | 296/77.1 |
| 4,778,214 | 10/1988 | Fu | 296/102 |
| 4,792,175 | 12/1988 | Gerber | 296/79 |

Primary Examiner—Robert R. Song
Attorney, Agent, or Firm—Perman & Green

[57] ABSTRACT

A motorized golf cart having a double wall thermo-formed canopy fixedly connected to and supported over a chassis. The canopy has a bottom wall with fastener holes passing therethrough. A frame is provided to support the canopy having a front generally rectangular member and a rear inverted U-shaped member with apertures for passage of bolts therethrough. Blind fasteners are positioned in the bottom wall fastener holes and bolts passed through the frame apertures and into the blind fasteners to securely mount the canopy to the frame.

17 Claims, 5 Drawing Sheets

GOLF CART HAVING AN IMPROVED ROOF

BACKGROUND OF THE INVENTION

1. Field of the Invention

The present invention relates to golf carts and, more particularly, to a motorized golf cart having an improved roof.

2. Prior Art

Various different roofs, tops, canopies and umbrellas exist in the prior art intend for use with motorized golf carts. U.S. Pat. No. 4,650,238 to Healey discloses a golf cart roof for stowing golf clubs and other golf accessories. U.S. Pat. No. 4,773,695 to Jones et al. discloses a golf cart with a windshield attachment. U.S. Pat. No. 4,792,175 to Gerber discloses a golf cart roof having a downwardly turned edge about its periphery. Inverted U-shaped tubular members support the roof about its periphery. U.S. Pat. No. 4,744,430 to McCoy discloses a solar powered golf cart with solar cell panels supported on its roof.

As noted from the above references, roofs for golf carts, apart from shielding occupants from sun and rain, can provide other functions. However, roofs of the prior art are not without their disadvantages. One disadvantage with prior art golf cart roofs is that they have relatively bland or plane shapes because of the types of supports necessary to properly support a roof over the golf cart and the type of roof.

Another disadvantage with prior art roofs is that they are relatively complicated to properly attach to the roof supporting structure.

Another disadvantage with prior art roofs is that their connection on a roof supporting structure is relatively unattractive.

It is therefore an objective of the present invention to provide a relatively simple, inexpensive and visually attractive roof for a golf cart.

It is also an objective of the present invention to provide a new type of roof for a golf cart that is relatively easy, inexpensive and visually attractive to connect to a motorized golf cart.

SUMMARY OF THE INVENTION

The foregoing problems are overcome and other advantages are provided by an improved roof structure for a motorized golf cart.

In accordance with one embodiment of the invention, a motorized golf cart is provided comprising a chassis, a drive means, a roof structure having a top, and means for connecting the top to the chassis. The top is a twin-sheet thermoformed member comprised of a relatively rigid thermoplastic material having a top wall, a bottom wall and a space therebetween at predetermined locations. The bottom wall has fastener holes passing therethrough. The means for connecting the top to the chassis comprising a roof support frame means having a front section and a rear section. The support frame means has apertures therethrough for passage of mounting bolts. Blind fasteners are positioned in the bottom wall holes and into the space between the top and bottom walls. Mounting bolts, passed through the apertures into the blind fasteners, securely mount the top to the support frame whereby the top connection is relatively easy, inexpensive and has a relatively attractive appearance.

In accordance with another embodiment of the present invention, a motorized golf cart is provided having a chassis, drive means and a roof structure. The roof structure comprises a relatively rigid canopy, frame means for supporting the canopy over a section of the chassis, means for positioning the canopy on the frame means, and means for fixedly connecting the canopy to the frame means. The canopy is comprised of a double walled construction having a relatively hollow center with holes passing through a first underside wall of the canopy. The means for supporting the canopy over a section of the chassis has a front inverted generally U-shaped member and a rear inverted generally U-shaped member. The front and rear members have top portions with apertures therethrough for mounting bolts to be mounted, at least partially, therein. The means for positioning the canopy on the frame means allows for the canopy to be placed on the frame means top portions at a predetermined position and comprises recesses in the underside wall of the canopy. The means for fixedly connecting the canopy to the frame means comprises fastener means position-ed, at least partially, in the canopy center through the holes in the underside wall of the canopy with the bolts and the fastener means cooperatingly fixing the first underside wall to the frame means top portions whereby the canopy is fixedly connected to the frame means.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
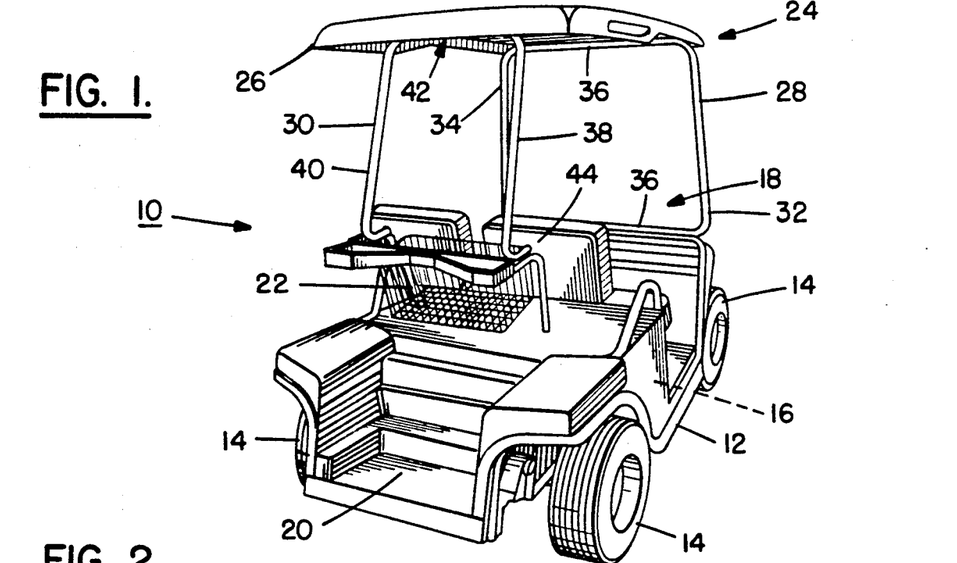
FIG. 1 is a perspective rear view of a golf cart incorporating features of the present invention.
Figure 2:
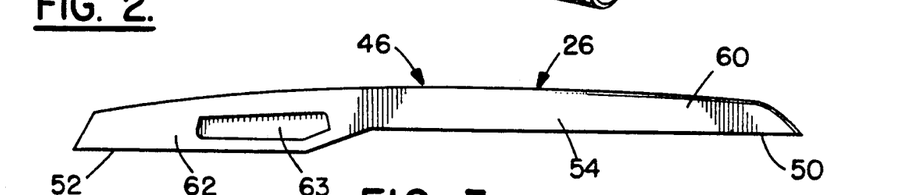
FIG. 2 is a plane side view of the roof of the golf cart shown in FIG. 1.
Figure 3:
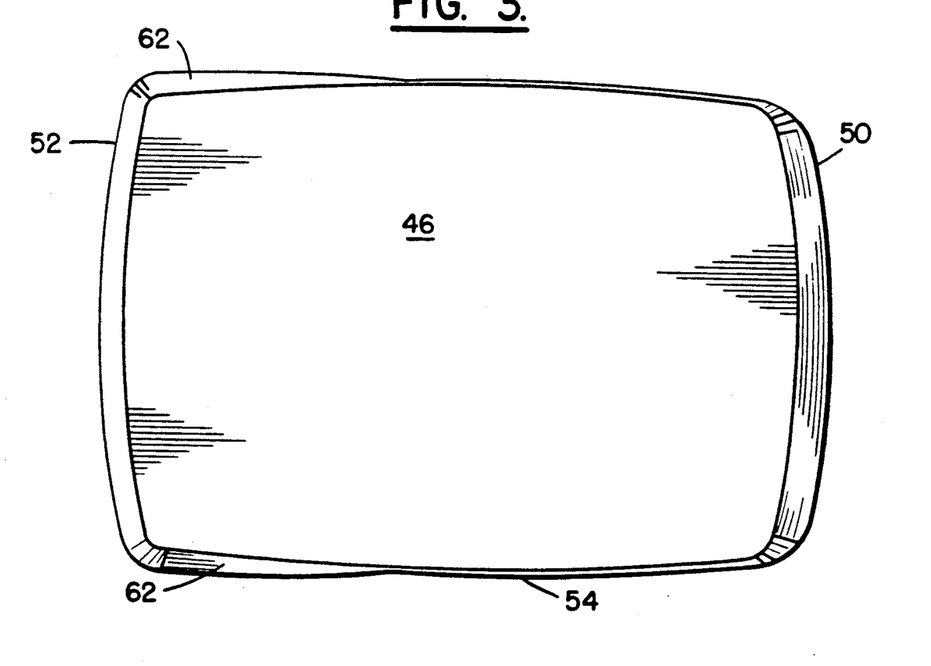
FIG. 3 is a plane top view of the roof shown in FIG. 1.

Referring to FIG. 1, there is shown a rear perspective view of a golf cart 10 incorporating features of the present invention. In the embodiment shown, the golf cart 10 generally comprises a chassis or body 12, wheels 14, a motor 16 for driving the wheels 14, a passenger sitting area 18, a golf bag storage area 20, a utility storage area 22, and a roof structure 24. The roof structure 24 generally comprises a roof or top 26, a front support frame 28 and a rear support frame 30. The roof 26, in the embodiment shown, substantially covers the entire chassis 12, but is mainly provided to shield occupants and contents of the golf cart 10 from such things as hot sunlight or rain. In the embodiment shown, the roof 26 is a substantially rigid structure comprised of a thermoplastic material. Preferably, the roof 26 is formed from a twin-sheet thermoforming process as will be described below. The front support frame 28 is generally comprised of a tubular member having generally four sides and forming a square or rectangle shape. However, any suitable type of front support frame can be provided. The rear support frame 30 is generally comprised of a tubular member having a generally inverted U-shape. The front support frame 28 has two legs 32 and 34 and upper and lower center sections 36 and 36A therebetween. The front support frame lower center section 36A is suitably connected to the chassis 12 at the front of the golf cart 10 as shown. The upper center section 36 of the front support frame 28 is connected to a front portion of the roof 26 as will be described below. The second support frame 30 generally comprises a first leg 38, a second leg 40 and a center section 42 therebetween. The second support frame legs 38 and 40 are suitably connected to the chassis 12 at their bottom ends behind the seating area 18. The second support frame center section 42 is suitably connected to the roof 26 at a rear portion of the roof as will be described below. As described above, the second support frame 30 generally comprises a inverted U-shape. However, in the embodiment shown, the second support frame legs 38 and 40 each have a bent or offset section 44. The bent or offset sections 44 of the legs 38 and 40 are provided such that the bottom ends of the legs 38 and 40 are connected to the chassis 12 at a suitable location such that the second support frame 30 will not interfere with an occupant's entry or exit from the golf cart 10 or storage of golf bags in the golf bag storage area 20. However, the frame 30 can nonetheless provide support for the relatively large roof 26 proximate its rear portion whereby the roof 26 is capably supported by the front and rear support frames 28 and 30 and can cover a substantial amount of the chassis or body 12. In the embodiment shown, the first support frame center section 36 is relatively longer than the second support frame upper center section 42. Thus, the distance between the second support frame legs 38 and 40 is relatively smaller than the distance between the first support frame legs 32 and 34. The relatively wide distance between the first support frame legs 32 and 34 can allow for positioning and mounting of a relatively wide windshield/sunshield (not shown), at the front of the golf cart 10. The relatively narrow distance between the second support frame legs 38 and 40 is provided such that the second support frame 30 does not interfere with or inconvenience a passenger of the golf cart 10 during entry, exit or occupation in the sitting area 18 and gives a general open feeling for an occupant even though the occupant is relatively substantially covered by the roof 26. The rear support frame can also have a rear windshield/sunshield (not shown) connected thereto. In an alternate embodiment of the invention, the front and rear support frames may be replaced with a single frame member, or two side frame members, or more than two frame members.

Referring now also to FIGS. 2, 3, 4, 5, 6, 7, 8 and 9, the roof or top 26 will be further described. As described above, the roof 26 is generally comprised of a relatively rigid thermoplastic material. In a preferred embodiment, the thermoplastic material is polyethylene. However, any suitable type of material may be used. The roof 26, also known as a sun canopy, generally comprises a top wall 46, a bottom wall 48, a front portion 50, rear portion 52, and two side portions 54 and 56. Preferably, the roof 26 is manufactured by a twin-sheet thermoforming process in which hollow products are produced at relatively high rates of speed, also commonly known as twin-sheet forming or dual-sheet forming. The twin-sheet thermoforming process is generally used as an alternative to blow and rotational molding. A good description of twin-sheet forming can be found in U.S. Pat. No. 4,428,306 to Dresen et al. which is incorporated by reference in its entirety herein. Generally, in twin-sheet forming, two sheets of material are first each mounted onto an appropriate thermoform vacuum mold. Each of the molds is a one sided mold having vacuum ports provided therein intended to draw the sheet of material against the mold when the sheet of material is heated so as to generally conform to the shape of the mold. Following the formation of each of the two sheets of material, the two mold halves, each of which is one sided by itself, are brought together compressing the two sheets of material therebetween. The two mold halves then compress the two sheets of material therebetween with the material of the roof 26 still being hot so that the two thermoplastic sheets of material that form the roof 26 are pressed together under pressure while continually in a semi-molten state. Thus, where the two sheets of material which form the roof 26 are pressed together, the material of each of the sheets fusses together with the material of the other sheet forming a continuous, seamless unitary structure at each such junction. Thus, at junctions between the two sheets that form the roof 26, the top wall 46 and the bottom wall 48 are substantially unitary with no space therebetween. In a preferred embodiment of the invention, the top wall 46, bottom wall 48 and junctions between the two walls have a thickness of about 0.12 inch. However, any suitable thickness can be used and may also be varied at different locations. Areas of the roof 26 in which there is no junction of the two sheets of material that form the roof have a space 58 between the top wall 46 and bottom wall 48. In a preferred embodiment of the invention, the top side of the top wall 46 is textured during the thermoforming process to give the top wall 46 an attractive appearance, reduce the visibility of dirt or dust on the roof 26 and allow for better run-off of rain from the top wall 46 of the roof. In the embodiment shown, the top wall 46 generally comprises a relatively gentle transverse and longitudinal curve forming a slight dome shape. The curve of the top wall 46 increases in slope proximate the front portion 50. The top wall 46 also forms relatively sharp drop-offs to form the side portions 54 and 56. In addition, the top wall 46 has a relatively steep drop-off at the rear portion 52 and flanges outwardly at the rear portion 52 and the rear areas of the side portions 54 and 56. The side portions 54 and 56 are substantially identical to each other and have front sections 60 and rear sections 62. The front section 60 is generally longer than the rear section 62. However, the rear section 62 is generally wider than the front section 60 and flanges outwardly as described above. In a preferred embodiment, the rear sections 62 have hand grips or impressions 63.

Figure 4:
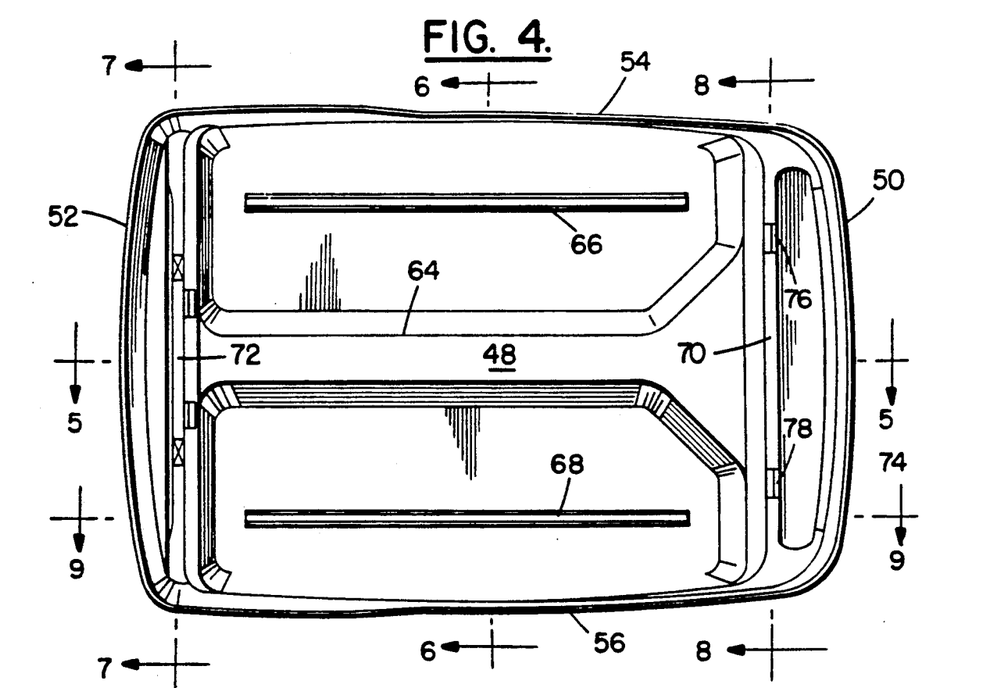
FIG. 4 is a plane bottom view of the roof shown in FIG. 1.
Figure 5:
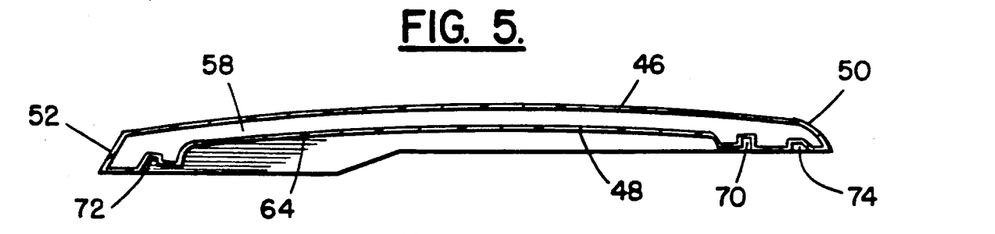
FIG. 5 is a cross-sectional view of the roof shown in FIG. 4 taken along line 5—5.
Figure 6:
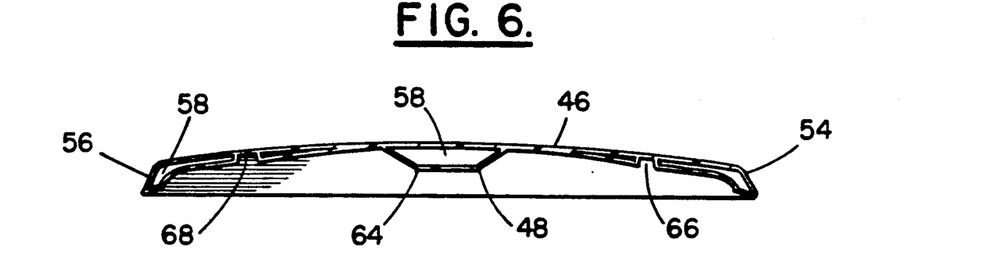
FIG. 6 is a cross-sectional view of the roof shown in FIG. 4 taken across line 6—6.
Figure 7:
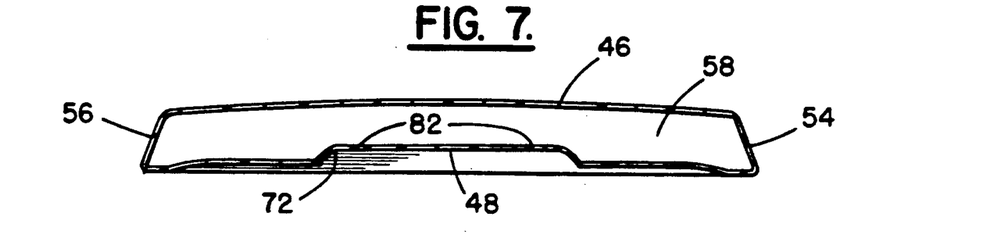
FIG. 7 is a cross-sectional view of the roof shown in FIG. 4 taken across line 7—7.
Figure 8:
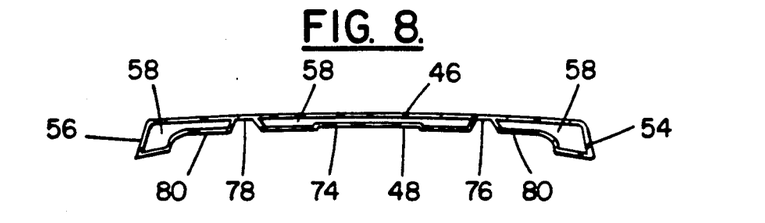
FIG. 8 is a cross-sectional view of the roof shown in FIG. 4 taken across line 8—8.
Figure 9:
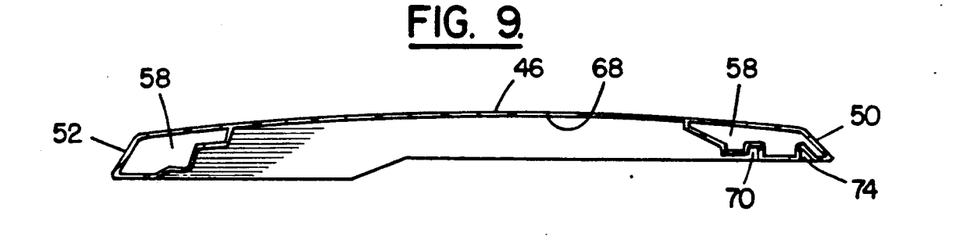
FIG. 9 is a cross-sectional view of the roof shown in FIG. 4 taken across line 9—9.

The bottom wall 48 generally forms a center structural rib 64, a first longitudinal structural junction 66, a second longitudinal structural junction 68, a front support frame receiving area or depression 70, a rear support frame receiving area or depression 72 and a windshield/sunshield receiving area or depression 74. The windshield/sunshield receiving area 74 is generally intended to receive a top portion of a windshield/sunshield (not shown) which may be mounted to the front support frame 28. The front support frame receiving area 70, as shown best in FIGS. 4 and 8, generally is recessed in the roof 26 to form a channel for receiving the front support frame upper center section 36, at least partially, therein. Two junctions 76 and 78 are provided in the receiving area 70 for structural support reasons as will be described below. Located in the front support frame receiving area 70 are two mounting holes 80 passing through the bottom wall 48 into the space 58 for passage of blind fasteners therethrough as will be described below. However, any suitable number of mounting holes may be provided and may be located in any suitable location in the front support frame receiving area. The width and length of the front support frame receiving area are substantially the same as the width and length of the front support frame upper center section 36 such that when the roof 26 is connected to the front support frame 28, the roof 26 may be supported on the front support frame 28 with the front support frame being received in the front support frame receiving area 70 which can substantially maintain the roof 26 in a predetermined position while fasteners are attached to the roof 26 and front support frame 28 as will be described below. The rear support frame receiving area 72, as best shown in FIGS. 4 and 7, is substantially the same length and width as the second support frame center section 42 and can receive, at least partially, the second support frame center section 42 therein. The rear support frame receiving area 72, in the embodiment shown, comprises two mounting holes 82 passing through the bottom wall 48 into the space 58. The mounting holes 82 are generally intended to receive blind fasteners therein. However, any suitable type of fastener and any suitable number or location of mounting holes may be provided. The rear support frame receiving area 72 can substantially receive the rear support frame center section 42 therein for positioning of the roof 26 on the rear support frame 30 prior to attachment of fasteners between the rear support frame 30 and the roof 26 as will be described below. Because the front and rear support frame receiving areas 70 and 72 are recessed, the recesses provide a means for positioning the roof on the support frames at a predetermined position. The recessed feature of the receiving areas 70 and 72 also improve the aesthetic appearance of the mounting of the roof 26 to the support frames 28 and 30.

Figure 10:
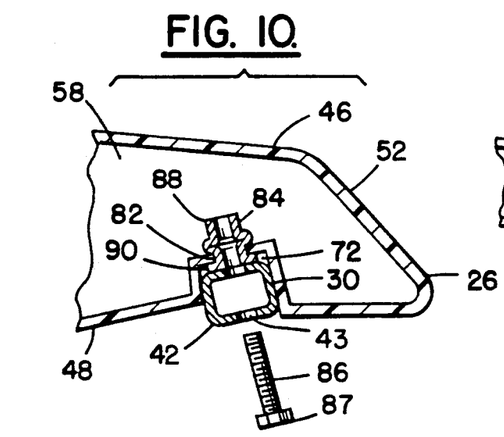
FIG. 10 is an enlarged partial cross-sectional view of the mounting of the roof shown in FIG. 4 to a support frame member at the rear of the roof.

Referring now also to FIG. 10, an enlarged partial cross-sectional view of the mounting of the rear support frame 30 to the roof 26 is shown. Generally, a blind fastener 84 is positioned in a mounting hole 82. The blind fastener 84 is generally provided to take advantage of the structure of the roof 26 having spaces therein to provide a relatively simple, inexpensive and visually aesthetic or substantially hidden connection of the rear support frame 30 to the roof 26. In a preferred embodiment of the invention, threaded inserts such as JACK NUT or WELL-NUTS threaded inserts, trademarks of Emhart Industries, Inc. of Shelton, Conn., can be used. Generally, a shaft portion 88 of the blind fastener 84 extends through the mounting hole 82. A flange portion 90 of the blind fastener 84 is generally sandwiched between the bottom wall 48 and the top of the second support frame second section 42. A mounting bolt 86 inserted through an aperture or mounting hole 43, extending through the rear support frame center section 42, can pass into the blind fastener 84 and make mating contact with threads in the shaft portion 88 such that when the mounting bolt 86 is properly screwed into the blind fastener 84, the blind fastener 84 will collapse as shown in FIG. 10 against the inside portion of the bottom wall 48 whereby the collapsed portion of the blind fastener 84 and a head 87 of the mounting bolt 86 substantially retains the rear support frame center section 42 in the rear support frame receiving area 72 thereby connecting the roof 26 to the rear support frame 30.

Figure 11:
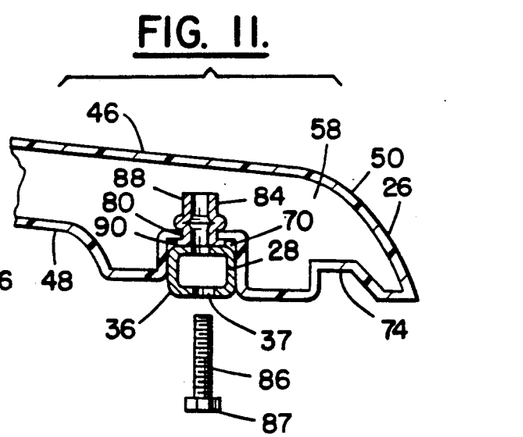
FIG. 11 is an enlarged partial cross-sectional view of the mounting of the roof shown in FIG. 4 to a support frame member at the front of the roof.

Referring now to FIG. 11, an enlarged partial cross-sectional side view of the connection of the front support frame 28 to the roof 26 is shown. Similar to the connection of the roof 26 to the rear support frame 30, in the embodiment shown, a blind fastener 84 is positioned in a mounting hole 80 with a shaft portion 88 extending through the hole 80 into the space 58 and a flange portion 90 being sandwiched between the bottom wall 48 and the upper center section 36 of the front support frame. A mounting bolt 86 can pass through a mounting hole 37 in the upper center section 36 into the shaft portion 88 of the blind fastener and be screwed into threads in the blind fastener 84 such that fastener 84 can at least partially collapse against the inner surface of the bottom wall 48 with the collapsed portion of the blind fastener 84 and the head portion 87 of the mounting bolt 86 substantially retaining the roof 86 on the front support frame 28. Thus, the roof 26 can be connected to the front support frame 28 in a relatively simple, inexpensive and substantially visibly hidden manner to fixedly retain the roof on the front support frame 28.

Figure 12A:
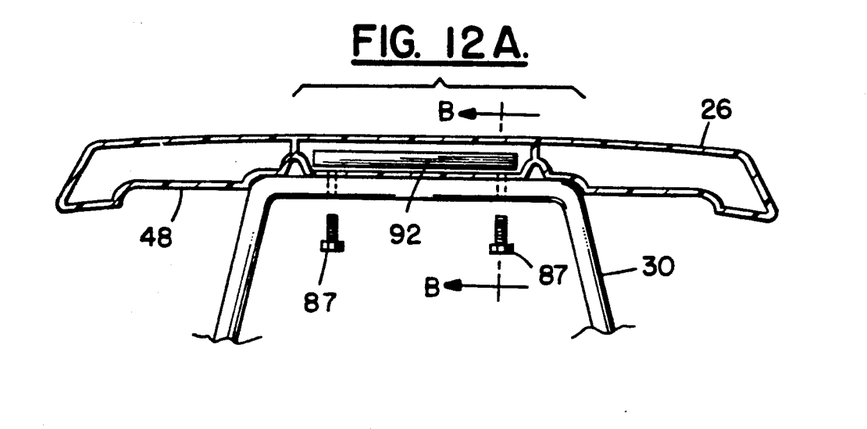
FIG. 12A is a cross-sectional view of an alternate embodiment of mounting the roof to a support frame member.
Figure 12B:
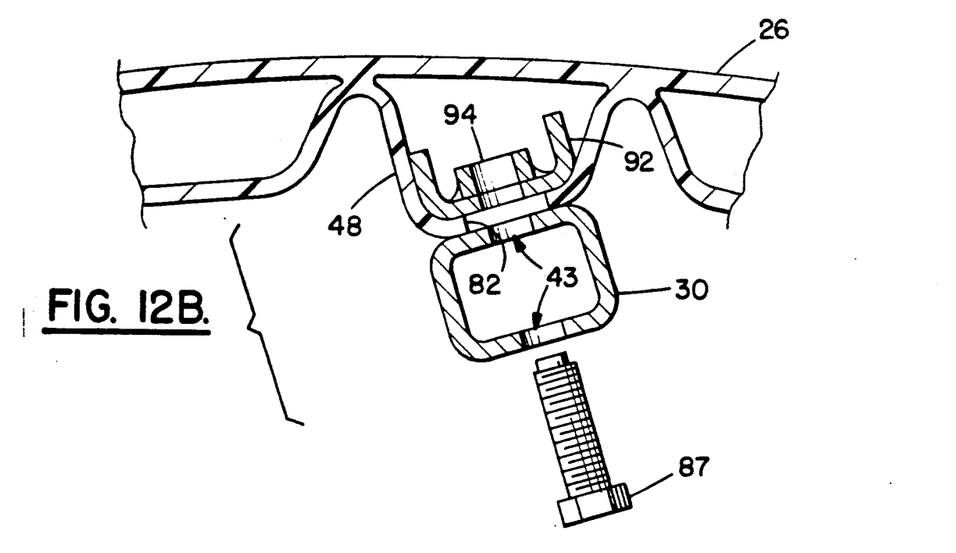
FIG. 12B is a schematic cross-sectional view of the embodiment shown in FIG. 12A taken along line B—B.

Referring now to FIGS. 12A and 12B, an alternate embodiment of the present invention is shown. In the embodiment shown, the roof 26 encapsulates a fastener bar 92. Bolts 87 extend up through holes 43 in the rear support 30, through holes 82 in the bottom wall 48 and into fastening portions 94 in the bar 92. The bar 92 and bolts 87 cooperate to fixedly sandwich the rear support 30 with the bottom wall 48 of the roof.

Figure 13:
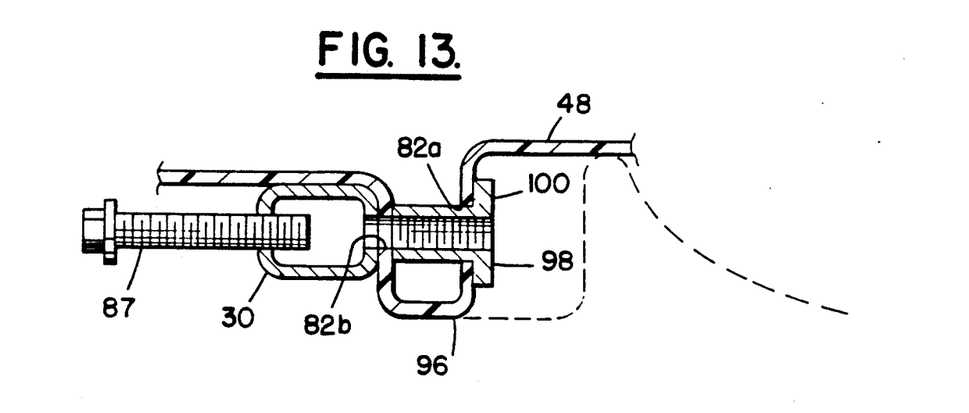
FIG. 13 is a cross-sectional side view of an alternate embodiment of mounting a roof to a support frame member.

Referring now to FIG. 13, an alternate embodiment of the present invention is shown. In the embodiment shown, the bottom wall 48 of the roof has a downward extending beam 96 with horizontal holes 82 therethrough. One hole 82a is larger than the corresponding other hole 82b. A load spreading fastener 98 extends through the larger hole 82a and abuts against the inside of the bottom wall 48 proximate the smaller hole 82b and also has a flange 100 that abuts against the outside of the bottom wall 48 proximate the larger hole 82a. A bolt 87 extends horizontally through the support frame 30 into the fastener 98 to fixedly connect the frame 30 to the roof.

Figure 14A:
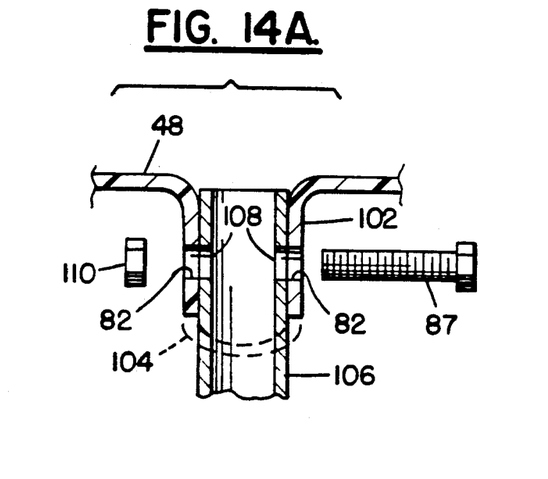
FIG. 14A is a cross-sectional view of an alternate embodiment of mounting a roof to a support frame member.
Figure 14B:
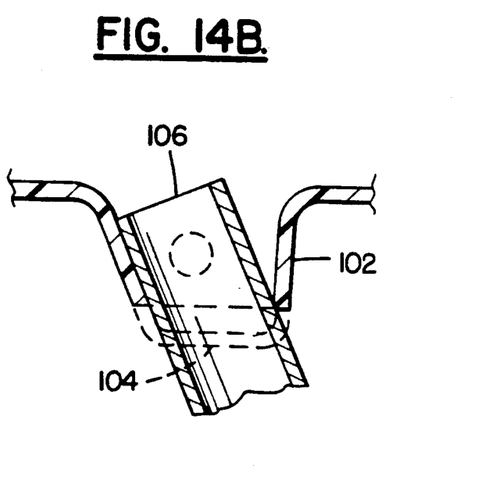
FIG. 14B is a cross-sectional side view of the embodiment shown in FIG. 14A.

Referring now to FIGS. 14A and 14B, an alternate embodiment of the present invention is shown. In the embodiment shown, the bottom wall 48 has a downward extending mound 102 formed when the roof is formed. A portion 104 of the mound 102 is removed to produce an opening through the bottom wall. A frame member 106 can extend into the mound. A bolt 87 can be passed through holes 82 in the mound 102 and holes 108 in the frame member with a nut 110 being connected to the bolt 87 to fixedly connect the roof to the frame member 106.

Figure 15A:
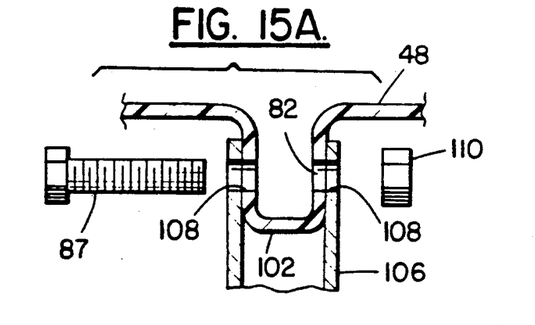
FIG. 15A is a cross-sectional view of an alternate embodiment of mounting a roof to a support frame member.
Figure 15B:
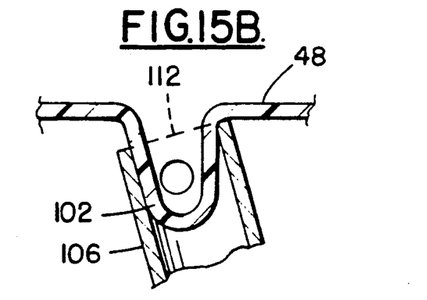
FIG. 15B is a cross-sectional side view of the embodiment shown in FIG. 15A.

Referring now to FIGS. 15A and 15B, an alternate embodiment of the present invention is shown. In the embodiment shown, a downwardly extending mound 102 is formed in the bottom wall 48 having holes 82 therethrough. The frame member 106 is generally tubular with an open end 112. The mound 102 is suitably sized and shaped to extend down into the frame member 106 via its open end 112. A bolt 87 can pass through holes 108 in the frame member and the holes 82 in the mound 102 with a nut 110 being connected to the bolt 87 to fixedly connect the roof to the frame member 106.

Figure 16:
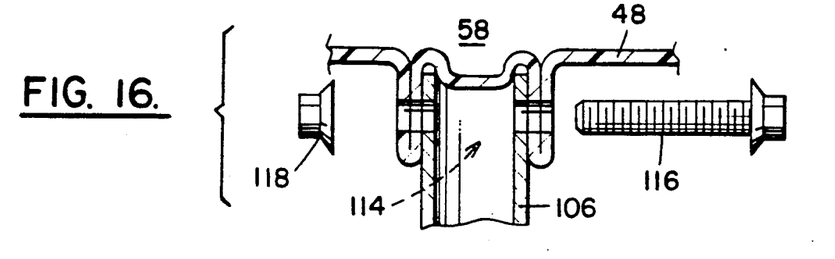
FIG. 16 is a cross-sectional view of an alternate embodiment of mounting a roof to a support frame member.

Referring now to FIG. 16, an alternate embodiment of the present invention is shown. In the embodiment shown, the bottom wall 48 forms a pocket 114 which does not allow the frame member 106 to extend into the space 58 between the top and bottom walls of the roof. The bottom wall 48 is generally folded over on itself as shown in the drawing. The frame member 106 is received in the pocket 114 and a load spreading bolt 116 and load spreading nut 118 fixedly connect the frame member 106 to the roof.

Figure 17A:
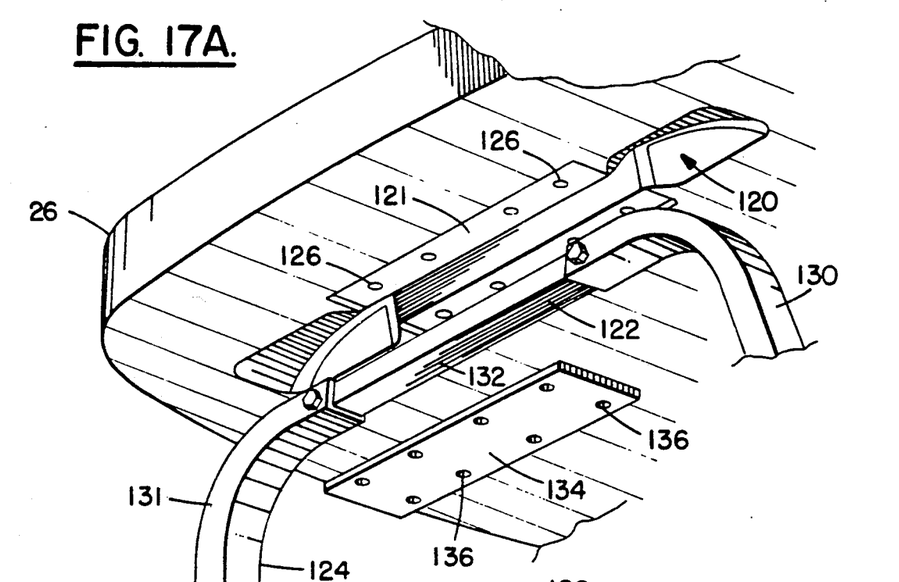
FIG. 17A is an exploded partial perspective view of an alternate embodiment of a mounting of a roof to a support frame member.
Figure 17B:
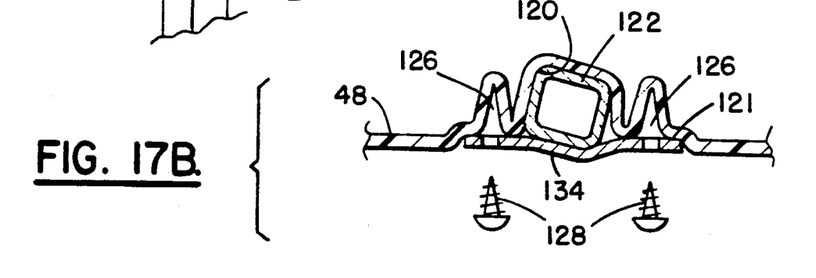
FIG. 17B is a schematic cross-sectional side view of the embodiment shown in FIG. 17A.

Referring now to FIG. 17A, an alternate embodiment of the present invention is shown. In the embodiment shown, a roof 26 has a recess 120 for receiving a top portion 122 of a frame 124. The roof 26 has upwardly extending depressions 126 on opposite sides of recess 120 for receiving self-tapping screws 128 (see FIG. 17B). The frame 124 has two side sections 130 and 131 and one center section 132 that are bolted together. A flat plate 134 is provided having holes 136 for the screws to pass through. The top portion 122 of the frame 124 is positioned in the recess 120 and sandwiched between the plate 134 and the bottom wall 48 in the recess 120. The screws 128 (see FIG. 17B) fixedly connect the plate 134 to the bottom wall 48 to fixedly connect the frame 124 to the roof 26. FIG. 17B shows an alternate embodiment wherein the plate 134 is suitably shaped to accommodate an angled frame top portion 122. A plate recess 121 is also provided in the bottom wall 48.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A motorized golf cart comprising:

a chassis;

drive means;

a roof structure having a twin-sheet thermoformed top comprised of a relatively rigid thermoplastic material and having a top wall, a bottom wall and a space therebetween at predetermined locations, said bottom wall having fastener holes passing therethrough into said space; and means for connecting said top to said chassis, said means for connecting comprising a roof support frame means having a front section and a rear section, said support frame means having apertures for passage of mounting bolts therethrough, blind fasteners positioned in said bottom wall holes and into said space, and mounting bolts passing through said apertures into said blind fasteners to securely mount said top to said support frame whereby said top connection is relatively easy and inexpensive to make.

2. A golf cart as in claim 1 wherein said top comprises recesses in said bottom wall to receive at least a portion of said support frame means front and rear sections for positioning said top on said support frame means prior to connection of said bolts to said blind fasteners and for aesthetically substantially hiding the top portions of said frame means with said top.

3. A golf cart as in claim 1 wherein said top comprises a single twin-sheet thermoformed member.

4. A golf cart as in claim 1 wherein said top is comprised of polyethylene.

5. A golf cart as in claim 1 wherein said walls are about 0.12 inch thick.

6. A golf cart as in claim 1 wherein said bolts are load spreading bolts.

7. A golf cart as in claim 1 wherein said blind fasteners are threaded collapsible inserts.

8. A motorized golf cart having a chassis, wheels, a drive means and a roof structure, said roof structure comprising:

a relatively rigid canopy having a double walled construction with a relatively hollow center section, said canopy having holes through a first underside wall;

frame means for supporting said canopy over at least a portion of said chassis, said frame means having a front generally rectangular member and a rear inverted generally U-shaped member, said front and rear members having top portions with apertures therethrough for positioning of mounting bolts, at least partially, therein;

means for positioning said canopy on said frame means top portions at a predetermined position comprising recesses in said underside wall for receiving at least a portion of said frame means top portions; and means for fixedly connecting said canopy to said frame means comprising fastener means positioned, at least partially, in said canopy center section through said holes with said bolts and said fastener means cooperatingly fixing said first underside wall to said frame means top portions whereby said canopy is fixedly connected to said frame means.

9. A roof for use on a roof support of a golf cart, the roof comprising:
- a top wall comprised of a rigid thermoplastic material, said top wall having a relatively slight longitudinal and transverse slope for allowing water to gravity feed off of said top wall;
- a bottom wall comprised of a rigid thermoplastic material, said bottom wall having means for at least partially receiving a portion of a roof support therewith, said bottom wall being substantially integrally formed with said top wall as a unitary member with a space section therebetween; and
- means for providing structural rigidity between said top and bottom walls comprising outer perimeter portions of said top and bottom walls being attached to each other and internal portions of said bottom wall being attached to said top wall in a substantially longitudinal direction.

10. A roof as in claim 9 wherein said means for providing structural rigidity further comprises portions of said bottom wall being shaped relative to said top wall to form a longitudinal center structural beam.

11. A roof as in claim 9 wherein said means for receiving a portion of a roof support comprises at least one upwardly extending channel.

12. A roof as in claim 11 wherein said means for receiving a portion of a roof support comprises a forward transverse channel and a rear transverse channel.

13. A roof as in claim 12 wherein said channels each comprise holes extending through said bottom wall into said space section.

14. A roof as in claim 9 wherein said top and bottom walls each are comprised of a sheet of thermoplastic material that are twin-sheet molded together to form a continuous, seamless unitary roof at junctures of said sheets.

15. A roof as in claim 9 wherein said top and bottom walls form a downwardly extending outer perimeter with two longitudinal side sections.

16. A roof as in claim 15 wherein said side sections each have a first relatively small front downwardly extending portion and a second relatively tall rear downwardly extending portion.

17. A roof as in claim 16 wherein each of said relatively tall rear downwardly extending portions have impressions formed in said thermoplastic material.

* * * * *